E. PARMENTIER.
Corn-Planters.
No. 140,432.
Patented July 1, 1873.
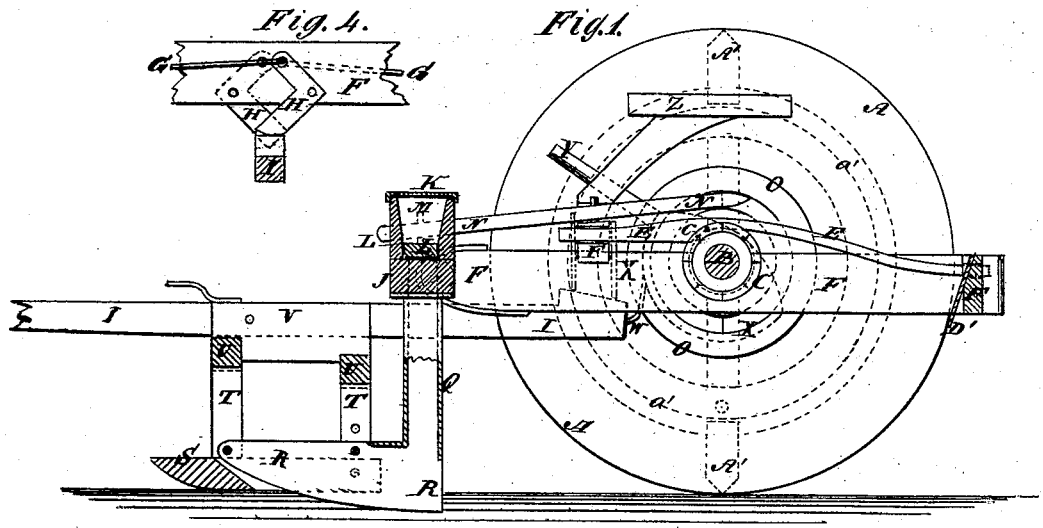
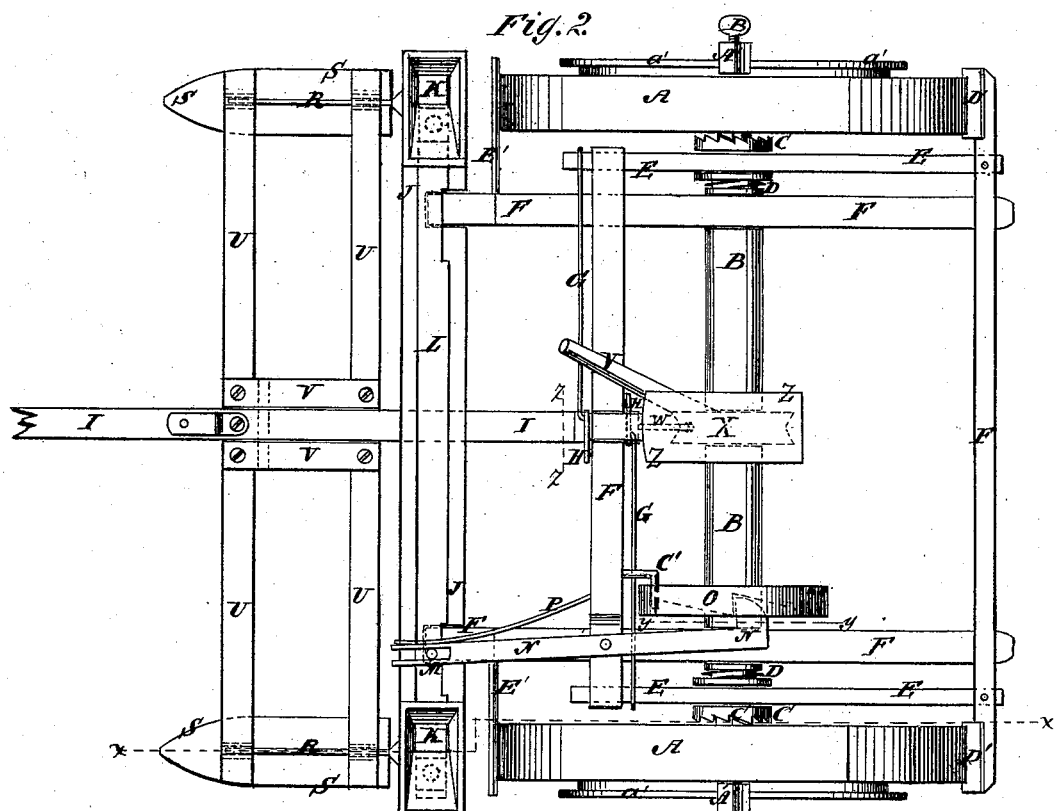
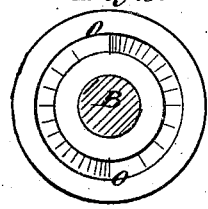

UNITED STATES PATENT OFFICE.

EDWARD PARMENTIER, OF CLIFTON, ILLINOIS.

IMPROVEMENT IN CORN-PLANTERS.

Specification forming part of Letters Patent No. 140,432, dated July 1, 1873; application filed January 25, 1873.

*To all whom it may concern:*

Be it known that I, EDWARD PARMENTIER, of Clifton, in the county of Iroquois and State of Illinois, have invented a new and useful Improvement in Corn-Planter, of which the following is a specification:

Figure 1 is a detail vertical longitudinal section of my improved corn-planter taken behind the line $x\ x$, Fig. 2. Fig. 2 is a top view of the same. Fig. 3 is a detail section taken through the line $y\ y$, Fig. 2. Fig. 4 is a detail section taken through the line $z\ z$, Fig. 2.

Similar letters of reference indicate corresponding parts.

The invention consists in the improvement of corn-planters, as hereinafter fully described and pointed out in the claims.

A are the drive-wheels, which revolve upon the journals of the axle B, and which are made to carry said axle with them in their revolution by clutches C, sliding upon the axle B, and which are held up against said wheels A by springs D placed upon said axle. The clutches C are withdrawn from the wheels A by the levers E, which rest and ride upon the grooved inner parts of the clutches C. The rear ends of the levers E are pivoted to the rear cross-bar of the frame F, and their forward ends work in slots in the forward cross-bar of the said frame F. To the forward ends of the levers E are attached the outer ends of the rods G, which pass inward along the opposite sides of the said front cross-bar of the frame F. The inner ends of the rods G are pivoted to the ends of the upper arms of the bent levers H, which are pivoted at their angles to the opposite sides of the said front cross-bar of the frame F. The lower arms of the bent or right-angled levers H are made the heavier, and when left free hang below the said cross-bar, so that the said levers may be struck and operated to withdraw the clutches C from the wheels A, by the rear end of the tongue I, when the furrowing and dropping devices are raised from the ground. To the projecting forward ends of the side bars of the frame F is hinged a cross-bar, J, to the ends of which are attached the hoppers K, to receive the seed. L is the seed-dropping bar, which slides longitudinally upon the cross-bar J, to receive the seed from the hoppers and convey it to the conductor-spouts. To the dropping-bar L is attached an upwardly-projecting pin, M, which enters a slot in a lever, N. The lever N is pivoted to a pin attached to the forward cross-bar of the frame F, and its rear end rests against the side of a wheel, O, attached to the axle B, against which it is held by a spring, P, attached to the forward cross-bar of the frame F, and which presses against the forward end of said lever N, as shown in Fig. 2. Upon the sides of the wheel O are formed inclines or cams, as shown in Fig. 3, and in dotted lines in Fig. 2, so that the dropping-bar L may be operated by the revolution of the wheel O. To the ends of the cross-bar J, below the hoppers K, are securely and rigidly attached the conductor-spouts Q, to the lower ends of which are rigidly attached the openers R. The rear parts of the openers R are widened, and have an opening formed in them directly beneath the discharge-opening of the spouts Q, so that the seeds may be deposited in the bottom of the furrow before said furrow becomes partially filled by the soil falling inward from its sides. The forward part of the lower edge of openers R are inclined or rounded upward to enable it to pass through the soil and over obstructions more readily. The openers R enter slots in the shoes or drags S, which are drawn along the surface of the ground, pushing back obstructions, and smoothing the said surface. To the drags S are attached standards T, the lower parts of which are slotted to receive the upper parts of the openers R, which are secured to said standards by bolts, several holes being formed to receive the said bolts, so that the said openers may be adjusted to project more or less below said drags S, according as the seed is to be deposited at a greater or less depth in the ground. The upper ends of the standards T are rigidly attached to two cross-bars, U, the middle parts of which are connected by short bars or blocks V, at such a distance apart as to receive the tongue I between them. The tongue I is pivoted to the bars or blocks V, as shown in Figs. 1 and 2. To the rear end of the tongue I is attached the end of a short cord or chain, W, the other end of which is attached to a segmental wheel or pulley, X, which rides upon the axle B, and to which is attached a lever, Y, so that by moving the free end of the lever Y to the rearward the rear end of the tongue I will be raised, raising the bars U and with them the drags S and openers R, for convenience in turning and passing from place to place. Z is the driver's seat, the standard of which is attached to the forward cross-bar of the frame F. To the outer sides of the drive-wheel A are attached, or upon them are formed, rings $a'$, which are grooved or flanged to receive flanges or hooks formed upon the bars A', the centers of which ride upon the outer ends of the journals of the axle B, and which are made of such a length that their ends may come in contact with and mark the surface of the ground as the said wheels A revolve. The markers A' are connected with the wheels A, so as to be carried around by and with the said wheels in their revolution, by set-screws B', which pass through the said bars A', and bear against the rings $a'$, so that the bars A' may be conveniently adjusted to mark the ground directly opposite the hills.

In starting in at the side of the field the machine is adjusted by bringing a mark upon the cam-wheel O, directly opposite a guide, C', attached to the frame F, which brings all the operating parts into proper relative position.

To the projecting ends of the rear cross-bar of the frame F are attached scrapers D', to clean the wheels A of any mud that may adhere to them. Arms E' may also be attached to the forward parts of the frame F for the same purpose.

Having thus described my invention, I claim as new and desire to secure by Letters Patent—

1. The arrangement of the springs D, levers E, rods G, and angle-levers H, with the tongue I, frame F, and clutches C, that connect the drive-wheels A with the axle B, to throw the said drive-wheels out of gear with said axle by raising the furrowing and dropping devices from the ground, substantially as herein shown and described.

2. A furrower, R, adjustable in slot of drag S and opening of standard T, as and for the purpose described.

3. The combination of the flanged or grooved rings $a'$, adjustable bars A', and set-screws B', with the drive-wheels A, substantially as herein shown and described, and for the purpose set forth.

EDWARD + PARMENTIER.
his mark.

Witnesses:
A. CLEMENT,
F. FRONVILLE.